US 11,484,835 B2

(12) United States Patent
Hedman

(10) Patent No.: US 11,484,835 B2
(45) Date of Patent: Nov. 1, 2022

(54) PROCESS AND ARRANGEMENT FOR REDUCING CARBON DIOXIDE IN COMBUSTION EXHAUST GASES

(71) Applicant: GREEN FOSSIL TECHNOLOGIES AB, Sparreholm (SE)

(72) Inventor: Mats Hedman, Sparreholm (SE)

(73) Assignee: GREEN FOSSIL TECHNOLOGIES AB, Sparreholm (SE)

( * ) Notice: Subject to any disclaimer, the term of this patent is extended or adjusted under 35 U.S.C. 154(b) by 0 days.

(21) Appl. No.: 17/414,660

(22) PCT Filed: Dec. 18, 2019

(86) PCT No.: PCT/SE2019/000018
§ 371 (c)(1),
(2) Date: Jun. 16, 2021

(87) PCT Pub. No.: WO2020/130901
PCT Pub. Date: Jun. 25, 2020

(65) Prior Publication Data
US 2022/0054979 A1    Feb. 24, 2022

(30) Foreign Application Priority Data

Dec. 22, 2018  (SE) .................................. 1830385-9
Aug. 10, 2019  (SE) .................................. 1930264-5

(51) Int. Cl.
*B01D 53/00*    (2006.01)
*B01D 53/26*    (2006.01)
(Continued)

(52) U.S. Cl.
CPC ......... *B01D 53/945* (2013.01); *B01D 53/007* (2013.01); *B01D 53/26* (2013.01);
(Continued)

(58) Field of Classification Search
CPC ...... B01D 53/007; B01D 53/62; B01D 53/74; B01D 2251/95; B01D 2257/504;
(Continued)

(56) References Cited

U.S. PATENT DOCUMENTS 3,353,335 A  11/1967 Caballerio
3,353,336 A  11/1967 Caballerio
(Continued)

FOREIGN PATENT DOCUMENTS

CA   2780103    12/2013
CN   106362578   2/2017
(Continued)

OTHER PUBLICATIONS

International Preliminary Report on Patentability regarding PCT Appl. No. PCT/SE2019/000018, completed Jan. 20, 2021, 8 pps.
(Continued)

*Primary Examiner* — Timothy C Vanoy
(74) *Attorney, Agent, or Firm* — Foley & Lardner LLP

(57) ABSTRACT

The present invention relates to a method and arrangement for reducing carbon dioxide in exhaust gases formed by combustion characterized by an exhaust system having a space (5) in which the exhaust gases are supplied to plant parts comprising chloroplasts with chlorophyll via means (6) for injection and an apparatus for generating and scattering of red light (7), preferably light from a laser and/or maser into the mixture of exhaust gases and plant parts, and of a grape sugar collecting device (8), and or, a collecting device (9) for water condensed from the exhaust gases.

10 Claims, 1 Drawing Sheet

(51) Int. Cl.
*B01D 53/94* (2006.01)
*F01N 3/20* (2006.01)

(52) U.S. Cl.
CPC ...... *F01N 3/2086* (2013.01); *B01D 2255/804* (2013.01); *B01D 2257/504* (2013.01); *B01D 2258/01* (2013.01); *B01D 2258/0283* (2013.01); *B01D 2259/806* (2013.01); *B01D 2259/808* (2013.01); *F01N 2240/22* (2013.01); *F01N 2570/10* (2013.01)

(58) Field of Classification Search
CPC ...... B01D 2258/0283; B01D 2259/802; B01D 2259/808; B01D 2258/01; B01D 2257/404; B01D 2258/0233; B01D 2255/804; B01D 53/945; B01D 2258/0291; B01D 2259/806; B01D 53/84; B01D 53/26; B01J 8/08; B01J 19/121; B01J 19/128; B01J 2208/00805; B01J 2219/00711; B01J 2219/00731; B01J 2219/00945; B01J 2219/0875; B01J 2219/12; Y02C 20/40; F01N 2570/10; F01N 3/00; F01N 2240/22; F01N 3/2086; Y02A 50/20
See application file for complete search history.

(56) References Cited

U.S. PATENT DOCUMENTS

| | | | |
|---|---|---|---|
| 6,648,949 B1 | 11/2003 | Der et al. | |
| 6,667,171 B2* | 12/2003 | Bayless | B01D 53/84 435/292.1 |
| 2010/0190241 A1* | 7/2010 | Jaggi | C12M 25/06 435/292.1 |
| 2014/0315266 A1* | 10/2014 | Stroiazzo-Mougin | C12P 3/00 435/134 |

FOREIGN PATENT DOCUMENTS

| | | | |
|---|---|---|---|
| DE | 10 2008 005 264 | 8/2009 | |
| EP | 2 155 853 A2 * | 2/2010 | ............ C12M 31/08 |
| EP | 2 208 521 | 7/2010 | |
| WO | WO-2011/002419 | 1/2011 | |
| WO | WO-201 8/056804 A1 | 3/2018 | |

OTHER PUBLICATIONS

"Uppfinnare anvander artificiell fotosyntes for att sanka koldioxidhalten i avgaserna", Newsvoice, May 10, 2019. Retrieved from the internet via https://newsvoice.se/2019/05/artificiell-fotosyntes-avgaser/ Jan. 31, 2020 and extract from online comments, May 11, 2019, retrieved from the internet Jan. 31, 2020, English and Swedish versions, 18 pps. each.
International Search Report and Written Opinion regarding Appl. No. PCT/SE2019/000018, dated Mar. 26, 2020, 11 pps.
Extended European Search Report regarding related European Application No. 19898140.9, dated Sep. 8, 2022, 7 pages.

* cited by examiner

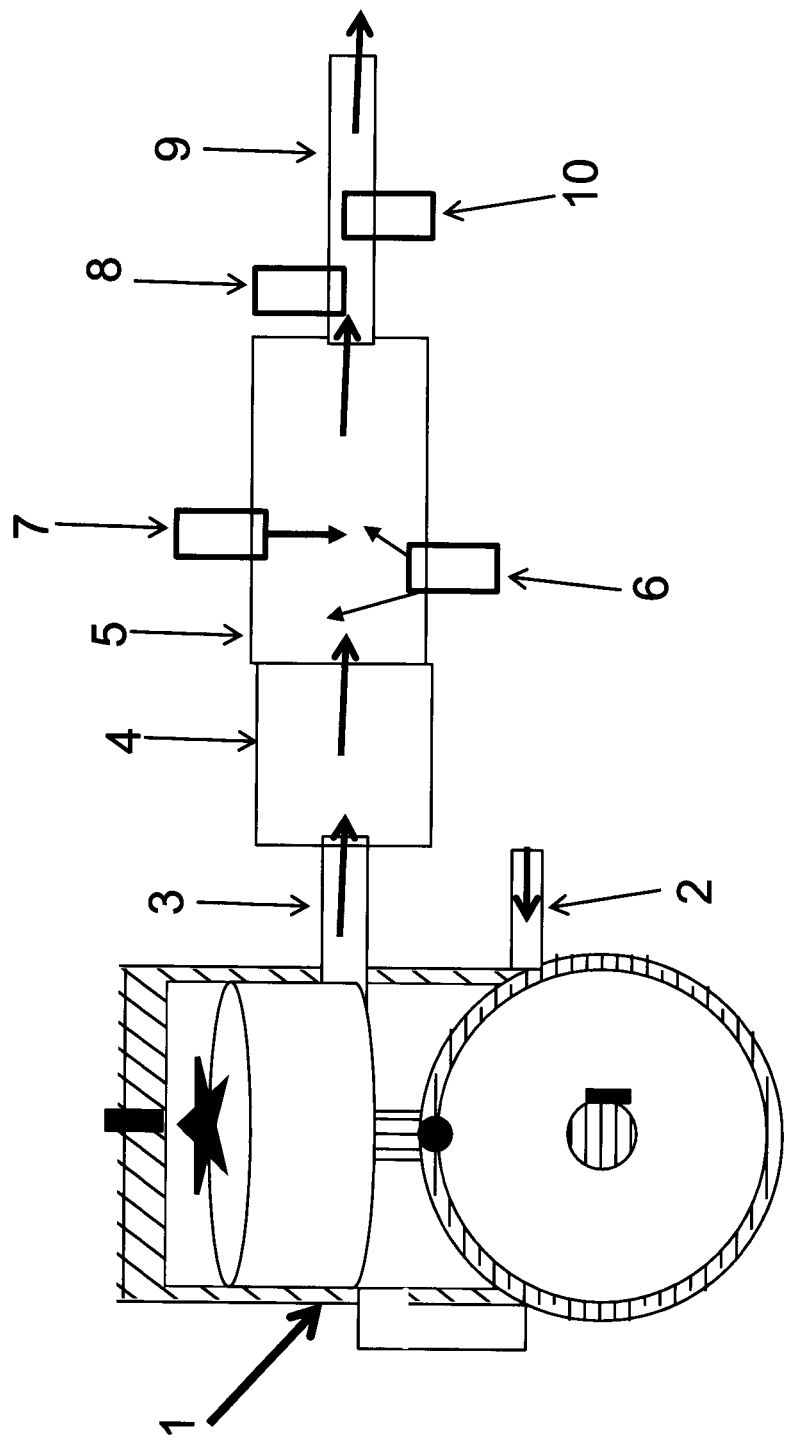

PROCESS AND ARRANGEMENT FOR REDUCING CARBON DIOXIDE IN COMBUSTION EXHAUST GASES

BACKGROUND

The present invention relates to processes and arrangements for reducing carbon dioxide in exhaust gases from combustion in, for example, internal combustion engines, heat and electricity power plants, for example, powered by coal, diesel oil, or wood chips, refuse incineration stations, cement factories, and more.

It is important to reduce carbon dioxide emissions to counteract a global temperature rise that increases the risk of extreme weather, elevated seawater level, forest fires and more. The object of the invention is to reduce carbon dioxide in exhaust gases from combustion. The object is achieved by the method and arrangement having obtained the features specified in the claims. The photosynthesis that takes place in, for example, green leaves, coniferous, grass is the basis of the invention and means that plants use the carbon dioxide of the atmosphere to grow. The green substance chlorophyll in said plant parts can be likened to a catalyst. Water, heat, sunlight are other essential components of photosynthesis. The simplified photosynthesis can be expressed $6H2O+6CO2+\text{sunlight}+\text{heat} \rightarrow C6H12O6$ (grape sugar)$+6O2$. It is known that especially the red range in the sunlight is important in photosynthesis.

SUMMARY

Finely divided plant parts including chloroplasts with chlorophyll are fed to the exhaust gases, whereby the plant parts are allowed to tumble and be mixed into the exhaust gases while irradiation is done with red laser or maser, whereby the above reaction takes place, which releases oxygen while converting carbon dioxide into grape sugar. Radiation can also take place with other complementary color to the chlorophyll's green color, although red color is preferred when that range, the wavelength range, is greatest in the sunlight.

Exhaust gas combustion engines may be a general example for describing the application of the invention. Necessary components of the invention are exhaust gas combustion including CO2, H2O, heat and light, especially red light. For example, Car exhaust has CO2 to be reduced and H2O and heat but not plant parts including chloroplasts with chlorophyll and not red light or light with other complementary color to green. Thus, what is missing must be supplied to the exhaust gases.

Advantageously, this is carried out after conventional exhaust gas purification such as particle filtration, catalytic oxidation of carbon dioxide to carbon dioxide and catalytic conversion of nitric oxide to nitrogen and water and at a suitable exhaust temperature, not so high that the plant parts are destroyed by heat but not so low that they are destroyed by cooling. Advantageously, the plant parts are collected for reuse.

BRIEF DESCRIPTION OF THE DRAWING

FIG. 1 is a drawing of a system, according to some embodiments.

DETAILED DESCRIPTION OF THE DRAWING

FIG. 1 schematically shows the application of the invention to an internal combustion engine 1, in this case a two-stroke engine, which engine type is essential in describing the principle of the invention. It does not have to apply to an engine either, but it can be any other type of combustion plant, for example a coal-fired power plant. A pipe 2 for supplying atmospheric air before combustion, a pipe 3 for the discharge of combustion gases. The pipe 3 comprises exhaust gas purification in a space 4 which may consist of particulate filter, catalyst for converting carbon dioxide to carbon dioxide and catalyst for converting nitrogen oxides to nitrogen and water. From space 4, the hot exhaust gases continue to space 5 where the present invention is applied. In space 5 there is at least one spreader of atomized material, plant parts comprising chloroplasts with chlorophyll 6 and at least one laser, and or, maser 7 which transmits red light, or light with other complementary color to the green color of the chlorophyll, into the combustion gases mixture of plant parts and carbon dioxide. and water vapor whereby carbon dioxide is reduced and converted to grape sugar and oxygen is released. In the last part 9 of the pipe 3 there is a collector of grape sugar 8, in which, in collected grape sugar, plant parts, supplied via the spreader 6, are captured for later reuse. A condenser 10 for condensing water vapor into water wherein plant parts comprising chloroplasts with chlorophyll, which are not trapped in the collector 8, are trapped and, after separation from water, can later be reused. The invention is not limited to the embodiment outlined above, but modifications can be made within the scope of the following claims.

The invention claimed is:

1. A process for reducing carbon dioxide in exhaust gases comprising carbon dioxide and water vapour formed by combustion, comprising:
   supplying the exhaust gases to a space,
   feeding atomized plant parts including chloroplasts with chlorofyll to the exhaust gases using a spreader,
   allowing the plant parts to tumble and be mixed into the exhaust gases while transmitting light into the space, the light having a red and/or other complimentary colour to a green colour of the chlorofyll, thereby reducing carbon dioxide in the exhaust gases, wherein the process is performed at a temperature of the exhaust gases in a range at which the plant parts are not destroyed.

2. The process according to claim 1, wherein the light is generated by at least one laser.

3. The process according to claim 1, wherein the light is pulsed and generated by at least one maser.

4. The process according to claim 1, further comprising condensing the water vapour and trapping the plant parts using a condenser.

5. A system for reducing carbon dioxide in exhaust gases formed by combustion, comprising:
   an exhaust system with a space configured to be supplied with the exhaust gases,
   a spreader of atomized plant parts configured to supply the atomized plant parts comprising chloroplasts with chlorophyll to the space,
   an apparatus for generating and scattering light of red and/or other complimentary colour to a green colour of the chlorofyll into a mixture of the exhaust gases and the atomized plant parts to cause reduction of carbon dioxidein the exhaust gases.

6. The system of claim 5, further comprising a water collecting device configured to collect water condensed from the exhaust gases.

7. The process according to claim 3, further comprising condensing the water vapour and trapping the plant parts using a condenser.

8. The process according to claim 1, wherein the transmitting light into the space causes release of oxygen and formation of grape sugar, the process further comprising collecting the grape sugar and the plant parts.

9. The system of claim 5, wherein the apparatus for generating and scattering light comprises at least one of a laser and a maser light.

10. The system according to claim 5, wherein the light generated and scattered into the mixture of the exhaust gases and the atomized plant parts causes release of oxygen and formation of grape sugar, the system further comprising a grape sugar collec